United States Patent [19]

Lechtman

[11] Patent Number: 5,753,865
[45] Date of Patent: May 19, 1998

[54] LOAD MEASUREMENT

[75] Inventor: David Lechtman, Sasolburg, South Africa

[73] Assignee: Amalgamated Consulting Engineers of South Africa (Proprietary) Ltd., Vereeniging, South Africa

[21] Appl. No.: 664,390

[22] Filed: Jun. 14, 1996

[30] Foreign Application Priority Data

Jun. 14, 1995 [GB] United Kingdom ............... 9512103

[51] Int. Cl.$^6$ .................................................. G01G 9/00
[52] U.S. Cl. ..................... 177/1; 177/25.11; 177/133; 177/136
[58] Field of Search ................ 177/1, 25.11, 25.12, 177/25.13, 25.14, 132, 133, 136

[56] References Cited

U.S. PATENT DOCUMENTS 4,691,792  9/1987  Shintani ........................... 177/1
5,239,137  8/1993  Patzig ............................. 177/136

Primary Examiner—Michael L. Gellner
Assistant Examiner—Randy W. Gibson
Attorney, Agent, or Firm—James Ray & Associates

[57] ABSTRACT

A method which determines the axle load of a vehicle consisting of measuring the weight of a wheel while the vehicle is at a first angle of inclination, measuring the weight of the wheel while the vehicle is tilted at a second angle of inclination, and then calculating the axle weight from the two weight readings and the two angles. A front and rear wheel is selected in turn in order to determine both front and rear axle weights. Alternatively, there may be two different force measuring scales which detect two different force components of gravity exerted by the wheel due to the fact that the two different scales are set a different angle with respect to the road surface.

20 Claims, 3 Drawing Sheets

LOAD MEASUREMENT

FIELD OF THE INVENTION

THIS INVENTION relates to load measurement. It relates in particular, but not necessarily exclusively, to a method of and apparatus for measuring axle mass load of a vehicle.

In order to reduce damage caused to road surfaces by road vehicles, especially heavily laden trucks, authorities in various countries throughout the world pass laws restricting the maximum permissible axle mass load of a vehicle. Generally, in order to ascertain whether or not an axle mass load is within the permissible legal limit, it is necessary to measure the axle load of the vehicle on a conventional weighbridge. It is an object of this invention to provide a solution to this problem.

For purposes of this specification, terms denoting inclination, slope, angle and the like, should be interpreted as denoting inclination, slope, angle and the like about a lateral axis which is perpendicular to the normal direction of travel of the vehicle.

SUMMARY OF THE INVENTION

Broadly, in accordance with a first aspect of the invention there is provided a method of determining wheel axle mass load of a vehicle in a selected plane, the method including measuring the forces exerted by a selected wheel of the vehicle at two different inclinations of the vehicle and calculating a force in the selected plane from the forces measured at said two different inclinations and from information about the inclinations.

In practice, front and rear wheels of the vehicle are selected in turn thereby to determine both front and rear axle mass loads of the vehicle.

The selected plane generally will be vertical so that the required force will be the equivalent of a weight of the vehicle on a level road surface. It is to be appreciated that, for the purposes of this specification, the term "selected wheel" includes a selected wheel set comprising two or more axles as commonly found in heavy duty vehicles.

The method may include measuring a first force exerted by the selected wheel at a first inclination absolutely and thereafter positioning the vehicle at a second inclination and measuring a change in inclination relative to the first inclination.

The method may further include measuring a change in a force relative to the first force when the vehicle is positioned at the second inclination.

Accordingly, the method may include the steps of positioning the vehicle at a first inclination in which a selected wheel rests on force measuring means;

determining the first inclination and measuring a first force exerted by the wheel on the force measuring means at the first inclination;

positioning the vehicle at a second inclination in which the selected wheel rests on force measuring means;

determining the change in inclination between the first and the second inclinations and measuring a second force exerted by the wheel on the force measuring means; and calculating the equivalent force the selected wheel exerts in the selected plane from the first inclination, the deviation in inclination, the first force and the second force.

The method may include the steps of positioning the vehicle at a first inclination in which the selected wheel rests on force measuring means;

determining the first inclination and measuring a first force exerted by the wheel on the force measuring means at the first inclination;

positioning the vehicle at a second inclination in which the selected wheel rests on force measuring means;

determining the change in inclination between the first and the second inclinations and measuring a force change relative to the first force; and calculating the equivalent force the selected wheel exerts in the selected plane from the first inclination, the deviation in inclination, the first force and the force deviation.

In certain circumstances, the method may include the steps of positioning the vehicle at a first inclination in which a selected wheel rests on force measuring means;

determining the first inclination and measuring a first force exerted by the wheel on the force measuring means at the first inclination;

positioning the vehicle at a second inclination in which the selected wheel rests on force measuring means;

determining the second inclination and measuring a second force exerted by the wheel on the force measuring means at the second inclination; and calculating the equivalent force that the selected wheel would exert in the selected plane from the first and second inclinations and the measured first and second forces.

The first and the second inclinations may be determined by angle measuring means. Instead, the inclinations may be generally determined using standard trigonometric techniques including measuring a distance between front and rear axles of the vehicle, a vertical distance by which the selected wheel has been displaced and a horizontal distance between the vertically displaced wheel and a corresponding non-displaced wheel.

The method may include driving the vehicle onto a first ramp so that the selected wheel is raised thereby to position the vehicle at the first inclination, and thereafter driving the vehicle onto a second ramp thereby to position the vehicle at the second inclination.

According to a further aspect of the invention there is provided measuring apparatus for measuring axle mass load of a vehicle in a selected plane, the apparatus including first support means for supporting a selected wheel at a first inclination of the vehicle;

first force measuring means for measuring a first force exerted by said selected wheel on said first support means;

second support means for supporting said selected wheel at a second inclination of the vehicle;

second force measuring means for measuring a second force exerted by said selected wheel on said second support means;

inclination measuring means for measuring said first and second inclinations; and processor means for calculating an equivalent force in the selected plane from the first and the second forces at said first and second inclinations and from information about the inclinations.

The first and the second support means may be provided by a first and a second platform for positioning the vehicle at the first and the second inclinations. The first and the second platforms may form a single unit having a first and a second ramp to permit the selected wheel to be driven onto the platforms. Instead, the first and the second support means may conveniently be provided by, for example, power driven lifting equipment arranged to position the vehicle at said first and second inclinations. The first and second force measuring means may then be provided by a single means operable at the two levels.

The force in the selected plane, when the selected wheel is not supporting two independent parts of the vehicle, may be calculated according to the following formula $$F_H = \frac{F_2 - F_1 \frac{\tan\beta}{\tan\alpha}}{1 - \frac{\tan\beta}{\tan\alpha}} \quad (I)$$

where $F_H$ = force exerted by a selected wheel in the selected plane;

$F_1$ = measured first force exerted by the selected wheel at the first inclination;

$F_2$ = measured second force exerted by the selected wheel at the second inclination;

$\alpha$ = first inclination relative to a reference plane; and $\beta$ = second inclination relative to the reference plane.

Typically, the first and second inclinations are measured relative to a horizontal plane thereby to determine the weight exerted by the vehicle on a level or horizontal road surface.

The inclination measuring means for measuring the first and second inclinations may be in the form of an inclinometer.

The processor means may include a look-up table. Additionally or instead, the processor means may include an electronic processor operable to calculate the equivalent force in the selected plane from the measured forces and the measured inclinations.

In the event of the selected wheel or wheel set supporting two independent parts of the vehicle, e.g. a horse and trailer arrangement in which the trailer is not coupled to the horse by a soft link and accordingly influences the weight distribution of the horse, the method may include measuring forces exerted by the selected wheel at two different inclinations of each part of the vehicle;

measuring gravitational force components in a plane angularly spaced from a vertical plane at each of said two different inclinations; and calculating an equivalent force in the selected plane from the forces and gravitational force components measured at said two different inclinations and from the information about the inclinations.

Accordingly, the apparatus may include force component measuring means for measuring a gravitational force component in a plane angularly spaced from the vertical plane at each of said two different inclinations. Typically, the force component measuring means is arranged in use to measure a gravitational force component parallel to an inclined road surface.

The force exerted in the selected plane, when the selected wheel is supporting two independent parts of the vehicle, may be calculated according to the following formula $$F_{HD} = F_3 + F_4 - F_{H1} - F_{H2} \quad (II)$$

where $F_{HD}$ = force exerted in the selected plane by a selected wheel supporting two independent parts of the vehicle;

$F_{H1}$ and $F_{H2}$ are forces exerted by front and rear wheels or wheel sets of the vehicle which do not support two independent parts of the vehicle and may be calculated according to the Formula I above;

$$F_3 = \frac{P\beta_1\beta_2 - P\alpha_1\alpha_2 \frac{\sin\beta_2}{\sin\alpha_2}}{\sin\beta_1 - \frac{\sin\alpha_1 \sin\beta_2}{\sin\alpha_2}} \; ; \text{ and}$$

$$F_4 = \frac{P\beta_1\beta_2 - P\alpha_1\alpha_2 \frac{\sin\beta_1}{\sin\alpha_1}}{\sin\beta_2 - \frac{\sin\alpha_2 \sin\beta_1}{\sin\alpha_1}}$$

wherein $\alpha_1$ = first inclination of one part of the vehicle;

$\alpha_2$ = first inclination of other part of the vehicle;

$\beta_1$ = second inclination of said one part of the vehicle;

$\beta_2$ = second inclination of said other part of the vehicle;

$P\alpha_1\alpha_2$ = gravitational force component in a plane angularly spaced from a vertical plane at first inclinations $\alpha_1$ and $\alpha_2$ of the two independent parts of the vehicle; and $P\beta_1\beta_2$ = gravitational force component in the plane off-set from the vertical at second inclinations $\beta_1$ and $\beta_2$ of the two independent parts of the vehicle.

BRIEF DESCRIPTION OF THE DRAWINGS

The invention is now described, by way of example, with reference to the accompanying diagrammatic drawings.

In the drawings.

DETAILED DESCRIPTION OF THE DRAWINGS

Figure 1:
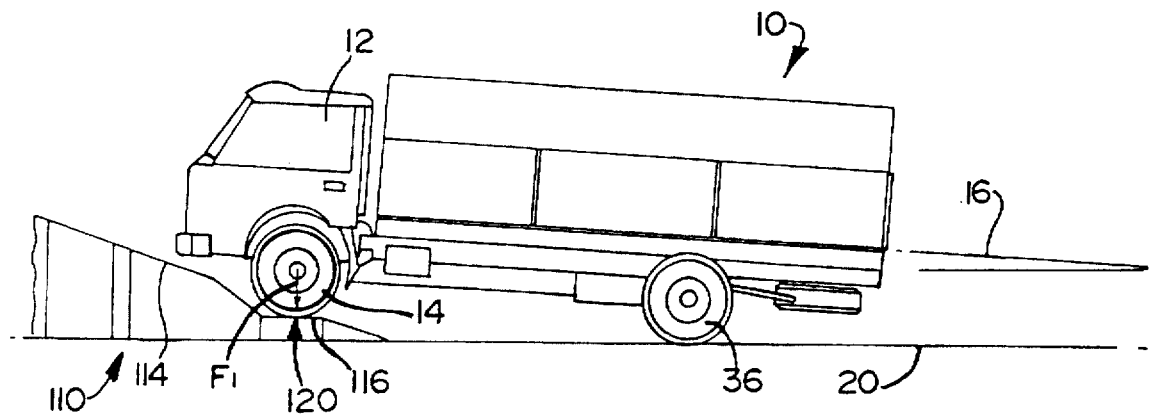
FIG. 1 shows a schematic side elevation of a vehicle supported at a first inclination and exerting a first force on a force measuring instrument.
Figure 2:
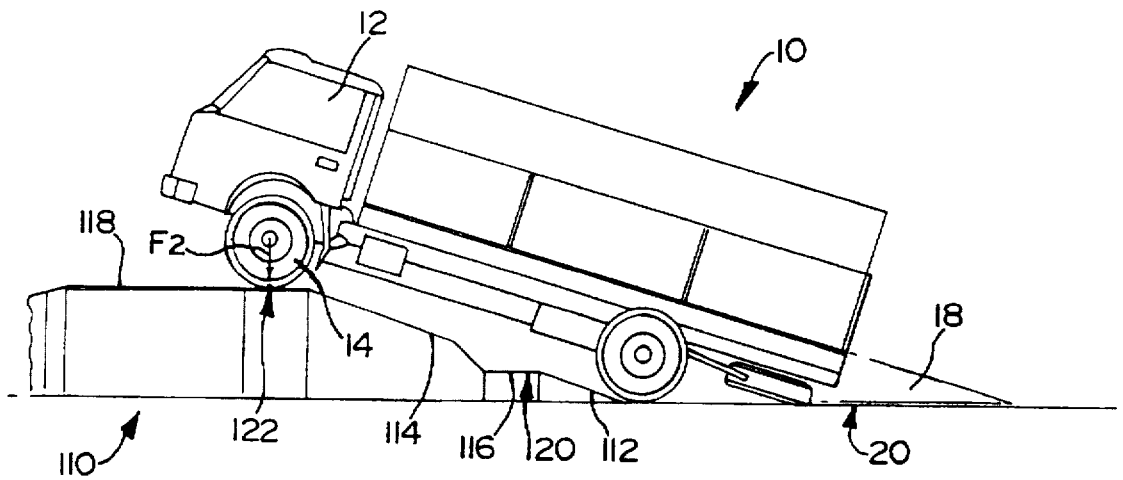
FIG. 2 shows a schematic side elevation of the vehicle of FIG. 1 supported at a second inclination and exerting a second force on a force measuring instrument.
Figure 3:
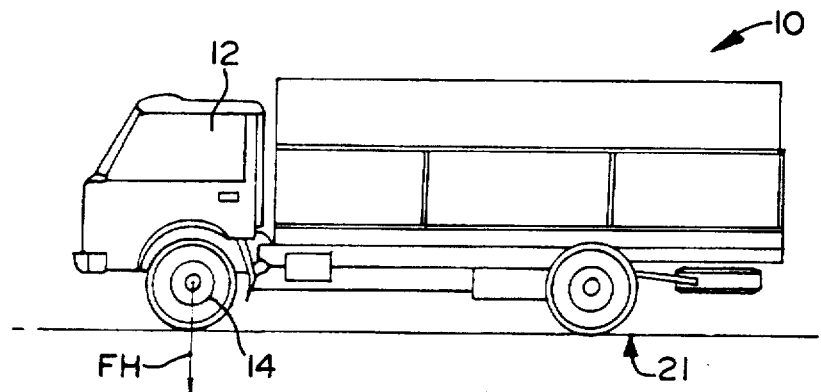
FIG. 3 shows a schematic side elevation of the vehicle of FIGS. 1 and 2 exerting a force on a horizontal or level road surface.

Referring to FIGS. 1 to 3 of the drawings, reference numeral 10 generally indicates a site or station along a road 20 (see FIGS. 1 and 2) where a method of determining axle mass load of a vehicle 12, e.g. a heavily laden truck, is carried out. The vehicle 12 has front and rear wheels 14 and 36 and the forces exerted by the wheels 14, 36 are not influenced by a drawn vehicle such as a trailer or the like. The road 20 need not be a horizontal or level road.

Figure 4:
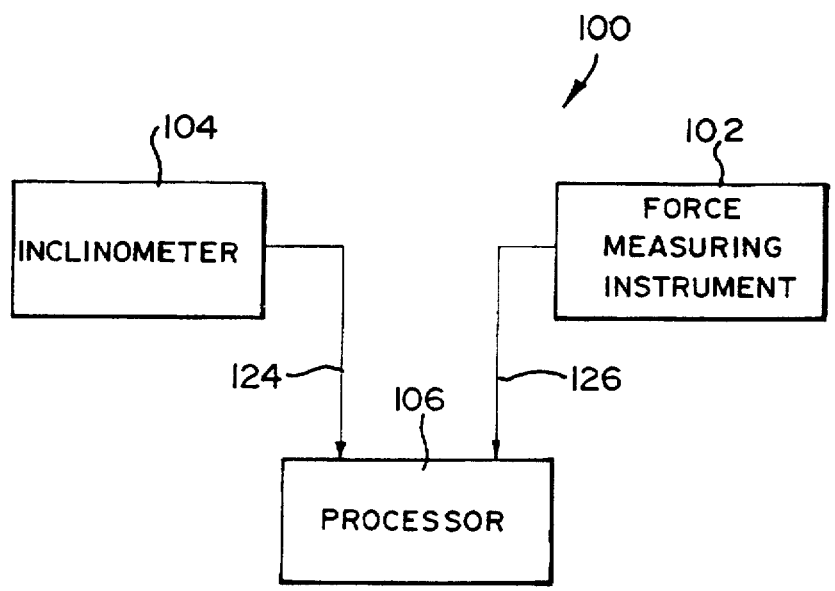
FIG. 4 shows a schematic block diagram of apparatus in accordance with the invention for measuring axle mass load of the vehicle.

The method includes measuring forces $F_1, F_2$ exerted by the selected wheel 14 of an axle at first and second inclinations 16, 18 respectively (see FIGS. 1 and 2) of the vehicle 12. The measured forces $F_1, F_2$ and information about the inclinations 16,18 are used to calculate a force $F_H$ (see FIG. 3) in a selected plane, which is a plane perpendicular to a hypothetically level road 21 (shown in FIG. 3 only). Thus the calculated force $F_H$ is in the form of the weight. Referring to FIG. 4, the invention extends to measuring apparatus 100 for measuring the axle mass load using the method.

The apparatus 100 includes a force measuring instrument 102 for measuring the forces $F_1$ and $F_2$, inclination measuring means in the form of an inclinometer 104 for measuring the inclinations 16, 18, and an electronic processor 106 for transforming the measured forces $F_1, F_2$ into the force $F_H$ exerted by the selected wheel 14 on the hypothetically level road 21.

The apparatus 100 further includes a ramp unit 110 which has a first and a second ramp 112,114 (see FIGS. 1 and 2) leading to a first and a second platform 116,118 respectively for supporting the wheel 14 with the vehicle 12 respectively at the first and the second inclinations 16,18. The force measuring instrument 102 has two force sensors 120,122 (see FIG. 2) located in the first and the second platforms 116,118 thereby to sense the forces $F_1, F_2$ exerted by the wheel 14 at the first and the second inclinations 16,18. In certain circumstances, the apparatus 100 includes power driven lifting equipment arranged to position a support surface, and thus the selected wheel 14 of the vehicle 12, at the first and second inclinations 16,18.

As the inclinometer 104 measures an angle between a magnetic field vector and a horizontal plane, the measured first and second inclinations 16,18 are inclinations relative to the hypothetically level road 21, which may not have the same slope as the road 20. The inclinations 16,18 are measured about a lateral axis which is perpendicular to the normal direction of travel of the vehicle 12.

When carrying out the method, the selected wheel 14 of the vehicle 12 is driven onto the platform 116 via the ramp 112 so as to position the vehicle 12 at the first inclination 16. The downward force $F_1$ exerted on the sensor 120 is then measured by the force measuring instrument 102. The measured force $F_1$ is then fed into the processor 106 via a line 124 (see FIG. 4). The first inclination 16 is then measured by means of the inclinometer 104, when the selected wheel 14 rests on the platform 116, and fed into the processor 106 via line 126. The wheel 14 of the vehicle 12 is then driven up the ramp 114 until it rests on the sensor 122 located on the platform 118. The downward force $F_2$ exerted on the sensor 122 is then measured and fed into the processor 106 via the force measuring instrument 102 via line 124. The second inclination 18 is then measured by the inclinometer 104 and fed into the processor 106 via line 126. The forces $F_1, F_2$ and inclinations 16, 18 are then used to calculate the force $F_H$ exerted on the hypothetically level road 21.

The force $F_H$ is calculated according to the following formula $$F_H = \frac{F_2 - F_1 \frac{\tan \beta}{\tan \alpha}}{1 - \frac{\tan \beta}{\tan \alpha}}$$

where $F_H$=force exerted on the hypothetically level road 21;
$F_1$=measured first force at the first inclination 16;
$F_2$=measured second force at the second inclination 18;
$\alpha$=first inclination 16 measured by the inclinometer 104; and $\beta$=second inclination 18 measured by the inclinometer 104.

Instead of measuring the second force $F_2$ and the second inclination 18 as absolute values, deviations in force and inclination relative to the first force $F_1$ and the first inclination 16 may be measured.

Figure 5:
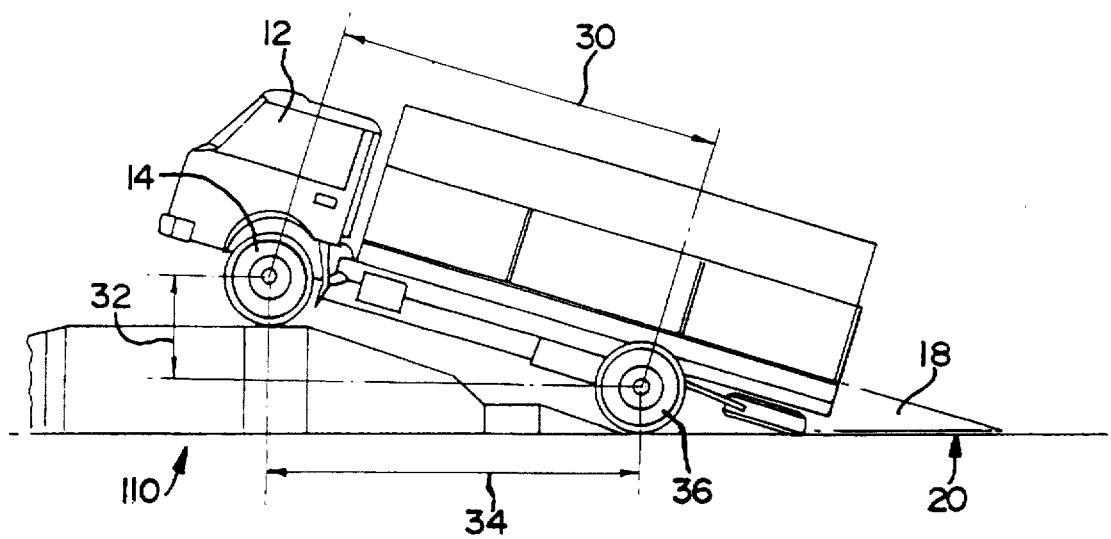
FIG. 5 shows the vehicle of FIG. 2 indicating distance measurements that may be conducted in order to determine the inclination.

Referring to FIG. 5, instead of measuring the first and the second inclinations 16,18 by means of the inclinometer 104, the first and the second inclinations 16,18 can be determined by measuring a distance 30 between front and rear axles of the vehicle 12, a vertical distance 32 by which the selected wheel 14 has been displaced above the road surface 20 and measuring a horizontal distance 34 between the vertical distance 32 and a corresponding non-displaced wheel 36. The first and second inclinations 16,18 can then be determined by using standard trigonometric techniques.

Figure 6:
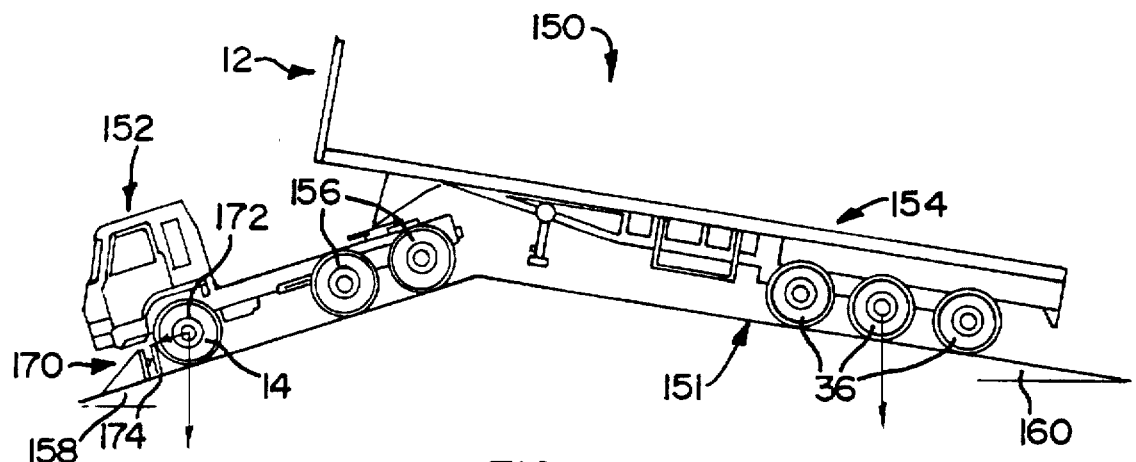
FIG. 6 shows a schematic side elevation of a vehicle having two independent body parts supported at a first inclination wherein each body part is at a different first inclination.
Figure 7:
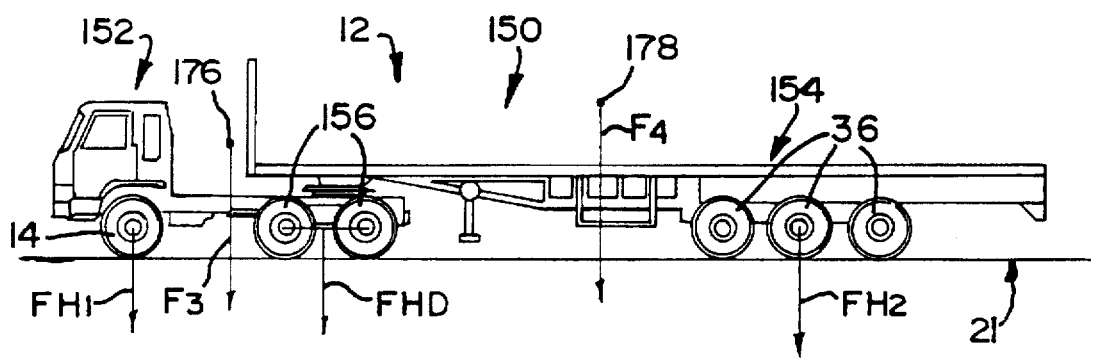
FIG. 7 shows a schematic side elevation of the vehicle of FIG. 6 exerting a force on a horizontal or level road surface.

Referring to FIGS. 6 and 7 of the drawings, reference numeral 150 generally indicates a further site or station along a road 151 where a method of determining axle mass load according to the invention is carried out. In FIGS. 6 and 7, like reference numerals have been used to indicate the same or similar features to those depicted in FIGS. 1, 2, 3 and 5.

The vehicle 12, as shown in FIGS. 6 and 7, comprises two independent parts in the form a horse 152 and a trailer 154. The method, as described above, is carried out in order to determine wheel axle mass load of a front wheel 14 and a rear wheel set 36. Thus, a force $F_{H1}$ (see FIG. 7) exerted by the front wheel 14 on a hypothetically level road 21 and a force $F_{H2}$ exerted by the rear wheel set 36 on the hypothetically level road 21 is determined.

A wheel set 156 supports the two independent parts of the vehicle 12, i.e., the horse 152 and the trailer 154. In order to determine the axle mass load of the wheel set 156, it is necessary to position the vehicle 12 along the road 151 so that the horse 152 and the trailer 154 are at two different inclinations 158 and 160.

Figure 8:
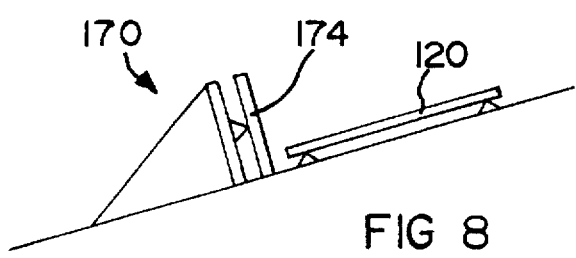
FIG. 8 shows a schematic side elevation of force component measuring means.

Force component sensing apparatus 170 is positioned so as to sense a gravitational force component $P\alpha_1\alpha_2$ 172 (see FIGS. 6 and 8) exerted by the vehicle 12 in a plane off-set from the vertical plane, e.g., parallel to a section of the road 151. The apparatus thus includes a force sensor 174 which is coupled to the force measuring instrument 102 (see FIG. 4) and the sensed force component $P\alpha_1\alpha_2$ 172 is fed into the processor 106 via line 126. The two different first inclinations 158, 160 (represented in the formula by $\alpha_1$ and $\alpha_2$ respectively) are then measured by means of the inclinometer 104 (see FIG. 4) and fed into the processor 106 via line 124.

The vehicle 12 is then positioned at a second inclination (not shown) at which the horse 152 and the trailer 154 are at two different inclinations (represented in the formula by $\beta_1$ and $\beta_2$) In the same manner as described above, a second sensed gravitational force component $P\beta_1\beta_2$ is determined and the values of the two second inclinations (not shown) are determined.

Using the aforementioned data, equivalent forces $F_3$, $F_4$ exerted at each centre of gravity 176, 178 (see FIG. 7) of the horse 152 and trailer 154 respectively are determined by the processor 106 according to the following formula:

$$F_3 = \frac{P\beta_1\beta_2 - P\alpha_1\alpha_2 \frac{\sin \beta_2}{\sin \alpha_2}}{\sin \beta_1 - \frac{\sin \alpha_1 \sin \beta_2}{\sin \alpha_2}} \quad ; \text{and} \quad \text{(III)}$$

-continued $$F_4 = \frac{P\beta_1\beta_2 - P\alpha_1\alpha_2 \frac{\sin\beta_1}{\sin\alpha_1}}{\sin\beta_2 - \frac{\sin\alpha_2 \sin\beta_1}{\sin\alpha_1}} \quad \text{(IV)}$$

wherein $\alpha_1$=first inclination of one part of the vehicle;

$\alpha_2$=first inclination of other part of the vehicle;

$\beta_1$=second inclination of said one part of the vehicle;

$\beta_2$=second inclination of said other part of the vehicle;

$P\alpha_1\alpha_2$=gravitational force component 172 in a plane off-set from a vertical plane at first inclinations $\alpha_1$ and $\alpha_2$ of the two independent parts of the vehicle; and $P\beta_1\beta_2$=gravitational force component (not shown) in the plane off-set from the vertical at second inclinations $\beta_1$ and $\beta_2$ of the two independent parts of the vehicle.

The force $F_{HD}$ exerted by the wheel set 156 on the hypothetically level road 21 is then determined by the processor 106 as follows:

$$F_{HD}=F_3+F_4-F_{H1}-F_{H2}$$

The Applicant believes that the invention, as illustrated, provides a relatively simple cost effective method and apparatus 100 for determining the equivalent axle mass load that a vehicle 12 would exert on a hypothetically level road 21 by measuring forces at two different inclinations relative to a road surface 20. The Applicant further believes that the method and apparatus 100 are suitable to carry out spot checks on a vehicle 12 at manned points along a road which need not be horizontal or level. These checks can be carried out to ascertain whether or not the mass load per axle of the vehicle is within the permissible legal limit irrespective of the slope of the road.

While the presently preferred embodiment and various additional alternative embodiments for carrying out the instant invention have been set forth in detail according to the Patent Act, those persons of ordinary skill in the technical art to which this invention pertains will recognize various alternative ways of practicing the invention without departing from the spirit and scope of the appended claims.

I claim:

1. A method of determining wheel axle mass load of a vehicle in a selected plane, the method including measuring the forces exerted by a selected wheel of the vehicle at two different inclinations of the vehicle and calculating a force in the selected plane from the forces measured at said two different inclinations and from information about the inclinations.

2. A method as claimed in claim 1, in which front and rear wheels of the vehicle are selected in turn thereby to determine both front and rear axle mass loads of the vehicle.

3. A method as claimed in claim 1, in which the selected plane is generally vertical so that the required force will be the equivalent of a weight of the vehicle on a level road surface.

4. A method as claimed in claim 1, which includes measuring a first force exerted by the selected wheel at a first inclination absolutely and thereafter positioning the vehicle at a second inclination and measuring a change in inclination relative to the first inclination.

5. A method as claimed in claim 4, which includes measuring a change in force relative to the first force when the vehicle is positioned at the second inclination.

6. A method as claimed in claim 5, which includes the steps of positioning the vehicle at a first inclination in which the selected wheel rests on force measuring means;

determining the first inclination and measuring a first force exerted by the wheel on the force measuring means at the first inclination;

positioning the vehicle at a second inclination in which the selected wheel rests on force measuring means;

determining the change in inclination between the first and the second inclinations and measuring a second force exerted by the wheel on the force measuring means; and calculating the equivalent force the selected wheel exerts in the selected plane from the first inclination, the deviation in inclination, the first force and the second force.

7. A method as claimed in claim 5, which includes the steps of positioning the vehicle at a first inclination in which the selected wheel rests on force measuring means;

determining the first inclination and measuring a first force exerted by the wheel on the force measuring means at the first inclination;

positioning the vehicle at a second inclination in which the selected wheel rests on force measuring means;

determining the change in inclination between the first and the second inclinations and measuring a force change relative to the first force; and calculating the equivalent force the selected wheel exerts in the selected plane from the first inclination, the deviation in inclination, the first force and the force deviation.

8. A method as claimed in claim 1, which includes the steps of positioning the vehicle at a first inclination in which a selected wheel rests on force measuring means;

determining the first inclination and measuring a first force exerted by the wheel on the force measuring means at the first inclination;

positioning the vehicle at a second inclination in which the selected wheel rests on force measuring means;

determining the second inclination and measuring a second force exerted by the wheel on the force measuring means at the second inclination; and calculating the equivalent force that the selected wheel exerts in the selected plane from the first and second inclinations and the measured first and second forces.

9. A method as claimed in claim 6, in which the first and the second inclinations are determined by angle measuring means.

10. A method as claimed in claim 6, in which the force in the selected plane, when the selected wheel is not supporting two independent parts of the vehicle, is calculated according to the following formula $$F_H = \frac{F_2 - F_1 \frac{\tan\beta}{\tan\alpha}}{1 - \frac{\tan\beta}{\tan\alpha}}$$

where $F_H$=force exerted by a selected wheel in the selected plane;

$F_1$=measured first force exerted by the selected wheel at the first inclination;

$F_2$=measured second force exerted by the selected wheel at the second inclination;

α=first inclination relative to a reference plane; and

β=second inclination relative to the reference plane.

11. A method as claimed in claim 6, which, in the event of the selected wheel supporting two independent parts of the vehicle which are not coupled by a soft link, includes measuring forces exerted by the selected wheel at two different inclinations of each part of the vehicle;

measuring gravitational force components in a plane angularly spaced from a vertical plane at each of said two different inclinations; and calculating an equivalent force in the selected plane from the forces and the gravitational force components measured at said two different inclinations and from the information about the inclinations.

12. A method as claimed in claim 11, in which the force exerted in the selected plane is calculated according to the following formula $$F_{HD}=F_3+F_4-F_{H1}-F_{H2}$$

where $F_{HD}$=force exerted in the selected plane by a selected wheel supporting two independent parts of the vehicle;

$F_{H1}$ and $F_{H2}$ are forces exerted by front and rear wheels of the vehicle which do not support two independent parts of the vehicle;

$$F_3 = \frac{P\beta_1\beta_2 - P\alpha_1\alpha_2 \frac{\sin\beta_2}{\sin\alpha_2}}{\sin\beta_1 - \frac{\sin\alpha_1 \sin\beta_2}{\sin\alpha_2}} ; \text{and}$$

$$F_4 = \frac{P\beta_1\beta_2 - P\alpha_1\alpha_2 \frac{\sin\beta_1}{\sin\alpha_1}}{\sin\beta_2 - \frac{\sin\alpha_2 \sin\beta_1}{\sin\alpha_1}}$$

wherein $\alpha_1$=first inclination of one part of the vehicle;

$\alpha_2$=first inclination of other part of the vehicle;

$\beta_1$=second inclination of said one part of the vehicle;

$\beta_2$=second inclination of said other part of the vehicle;

$P\alpha_1\alpha_2$=gravitational force component in a plane angularly spaced from the vertical plane at first inclinations $\alpha_1$ and $\alpha_2$ of the two independent parts of the vehicle; and $P\beta_1\beta_2$=gravitational force component in the plane off-set from the vertical at second inclinations $\beta_1$ and $\beta_2$ of the two independent parts of the vehicle.

13. Measuring apparatus for measuring axle mass load of a vehicle in a selected plane, the apparatus including first support means for supporting a selected wheel at a first inclination of the vehicle;

first force measuring means for measuring a first force exerted by said selected wheel on said first support means;

second support means for supporting said selected wheel at a second inclination of the vehicle;

second force measuring means for measuring a second force exerted by said selected wheel on said second support means;

inclination measuring means for measuring said first and second inclinations; and processor means for calculating an equivalent force in the selected plane from the first and the second forces at said first and second inclinations and from information about the inclinations.

14. Measuring apparatus as claimed in claim 13, in which the first and the second support means are provided by a first and a second platform for positioning the vehicle at the first and the second inclinations.

15. Measuring apparatus as claimed in claim 14, in which the first and the second platforms are formed by a single unit having a first and a second ramp to permit the selected wheel to be driven onto the platforms.

16. Measuring apparatus as claimed in claim 13, in which the first and the second support means are provided by power driven lifting equipment arranged to position the vehicle at said first and second inclinations.

17. Measuring apparatus as claimed in claim 13, in which the processor means includes a look-up table.

18. Measuring apparatus as claimed in claim 13, in which the processor means includes an electronic processor operable to calculate the equivalent force in the selected plane from the measured forces and the measured inclinations.

19. Measuring apparatus as claimed in claim 13, which includes force component measuring means for measuring a gravitational force component in a plane angularly spaced from a vertical plane at each of said two different inclinations.

20. Measuring apparatus as claimed in claim 19, in which the force component measuring means is arranged in use to measure a gravitational force component parallel to an inclined road surface.

* * * * *